Nov. 22, 1927.
H. J. WIMBERLEY
CLEANING PLANT
Filed Jan. 8, 1927
1,650,478
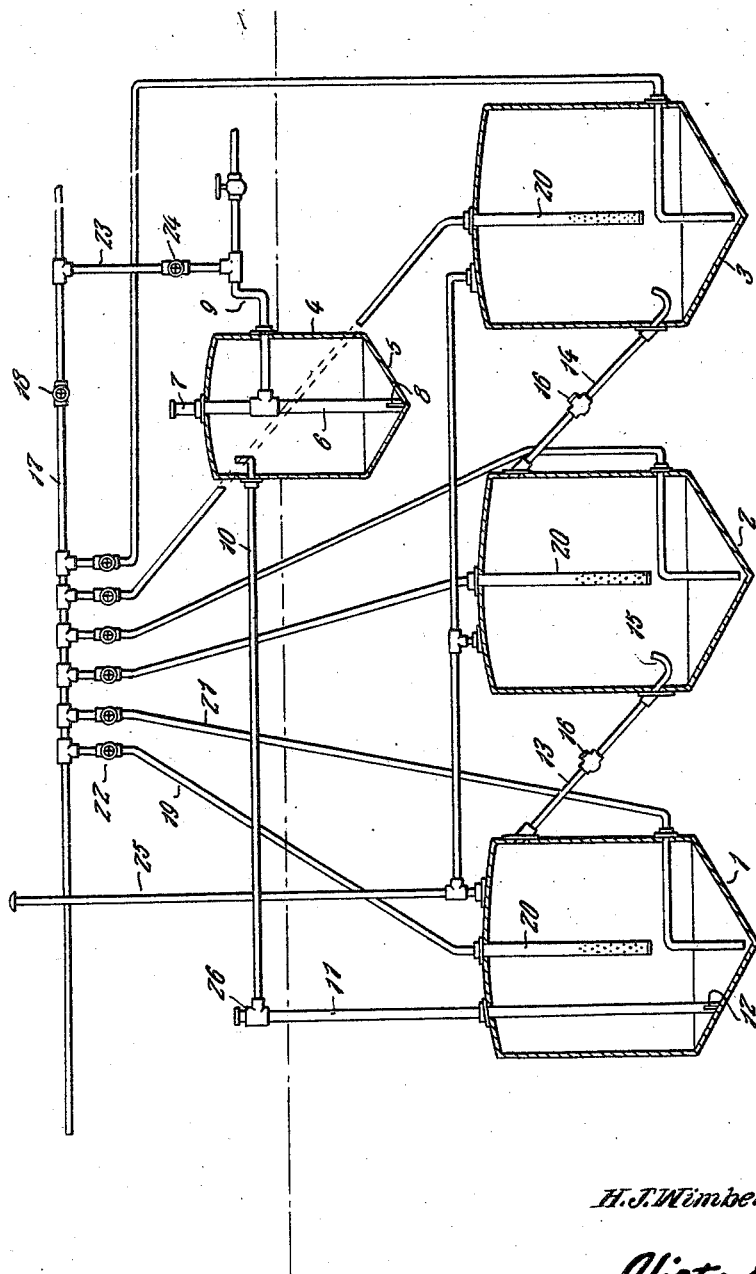
H. J. Wimberley
INVENTOR
BY Victor J. Evans
ATTORNEY Patented Nov. 22, 1927.

1,650,478

UNITED STATES PATENT OFFICE.

HARVEY JAMES WIMBERLEY, OF AUSTIN, TEXAS.

CLEANING PLANT.

Application filed January 8, 1927. Serial No. 159,912.

This invention relates to a gasoline cleaning plant for clothes cleaning establishments and the like, the general object of the invention being to provide means for removing water and foreign matter from the gasoline which has been used for cleaning purposes so that this gasoline can be used over again.

Another object of the invention is to provide means for cleaning out the pipe lines and the various tanks by steam and also to provide means whereby the pump forming a portion of the plant can be used to remove the foreign matter and water collecting in the tanks as well as the material removed from the walls of the tanks by the steam.

This invention also consists in certain other features of construction and in the combination and arrangement of the several parts, to be hereinafter fully described, illustrated in the accompanying drawings and specifically pointed out in the appended claims.

In describing my invention in detail, reference will be had to the accompanying drawing which shows a diagrammatic view of the plant.

In this drawing, 1, 2 and 3 indicate a series of settling tanks which are preferably buried underground and 4 indicates a separator tank which is but partly buried in the ground. All of these tanks are provided with cone-shaped bottoms 5. A pipe 6 is vertically arranged in the center of the tank 4 and has its lower end connected with the apex of the bottom of the tank with its upper end passing through the top of the tank, the said upper end being provided with a closing cap 7 and a slot 8 being formed in the lower end of the pipe. A pipe 9 connects the pipe 6 with the tubs or washers in which the clothes or the like are cleaned by the gasoline so that by opening suitable valves, this gasoline, which is to be cleaned, will enter the tank 4 through the slot 8 in the bottom of the pipe 6 and after passing through water and a suitable settling compound placed in the said tank, will rise to a level where it will flow into a pipe 10 which is connected with a vertically arranged pipe 11 which passes into the tank 1 where it has its lower end fastened to the conical bottom of said tank. This pipe is provided with a slot 12 in its lower end. The gasoline is partially freed of impurities in the tank 4 and as it rises in the tank 1, other impurities will collect in the bottom of the said tank 1 and as the gasoline rises in the tank 1, it will reach the upper end of a pipe 13 and pass down the pipe into the lower part of the tank 2 where the gasoline will be rid of further impurities by such impurities settling in the bottom of the tank 2 and then it will pass to the tank 3 by way of the pipe 14 which is similar to the pipe 13. Each of these pipes 13 and 14 has an upwardly curved lower end 15 which is located in the tank so that the gasoline flowing from one tank into the other will be directed upwardly and thus the impurities in the bottom of the tank will not be stirred up. These pipes 13 and 14 are also provided with the valves 16. A pipe line 17 has one end connected with a steam supply and its other end is connected with a suitable pump, valves 18 being arranged in the line to cut off either the pump or the steam. A branch line 19 connects the line 17 with a perforated tube 20 depending from the tops of each of the tanks 1, 2 and 3, the perforated tube terminating an appreciable distance from the lower end of the tank. A second branch line 21 connects the pipe 17 with each of the settling tanks, that portion of the line within the tank extending to a point close to the apex of the cone-shaped bottom. A valve 22 is located in each branch line. A branch line 23 connects the pump line with the pipe 9 and has a suitable valve 24 therein. The settling tanks are connected with the vent pipe 25 and the upper end of the pipe 11 is closed by a pipe 26.

From the foregoing it will be seen that by shutting off the steam supply and opening the valve in any one of the branch lines 19, the pump can be used to draw gasoline from any one of the settling tanks through the perforated tube 20. If the gasoline is to pass through all of the settling tanks, it will, of course, be understood that the valve in the last pipe 19 would be opened and the others closed so that the pump would draw the gasoline from the tank 3. The pump will deposit the gasoline in a suitable receptacle where it can be used over again for cleaning purposes. When the settling tanks are to be cleaned, the valve in the pump side of the line 17 is closed so that steam will pass through the branches 19 and through the perforations in the tube 20 into the tanks to clean the same and then the steam is shut off, the valves in the lines 19 closed and those in the lines 21 opened.

Then the pump is started up so that it will draw the water and impurities from the bottoms of the tanks through the lines 21. It will also be seen that the tank 4 can be cleaned by introducing steam therein through the line 23 by opening the valve 24 and the impurities from the tank can be drawn therefrom by removing the cap 7 and attaching a pump to the upper end of the pipe 6. The pipe 6 is used to place the cleaning compound in the tank by removing the cap 7.

It is thought from the foregoing description that the advantages and novel features of my invention will be readily apparent.

I desire it to be understood that I may make changes in the construction and in the combination and arrangement of the several parts, provided that such changes fall within the scope of the appended claims.

What I claim is:—

1. A cleaning plant of the class described comprising a number of settling tanks, a pipe connecting the upper portion of one tank with the lower portion of the next tank, a combined steam and pump line, a branch pipe connecting the same with the upper part of each settling tank, a branch line connecting the same with the bottom of each settling tank, valves in the branch lines, a separator tank, means for introducing the fluid to be cleaned thereinto and means for connecting the upper portion of said separator tank with the first settling tank so that the fluid can pass from the separator tank into the first settling tank.

2. A cleaning plant of the class described comprising a number of settling tanks, a pipe connecting the upper portion of one tank with the lower portion of the next tank, a combined steam and pump line, a branch pipe connecting the same with the upper part of each settling tank, a branch line connecting the same with the bottom of each settling tank, valves in the branch lines, a separator tank, a pipe extending into the separator tank and having its bottom connected with the bottom thereof, the lower end of the pipe having a slot therein, means for connecting the pipe with the supply pipe for the liquid to be cleaned, a pipe connected with the top part of the separator tank, a second pipe connected with the last mentioned pipe and extending into the first settling tank with its lower end connected to the bottom of the tank, said lower end of the pipe having a slot therein.

3. A cleaning plant of the class described comprising a number of settling tanks, a pipe connecting the upper portion of one tank with the lower portion of the next tank, a combined steam and pump line, a branch pipe connecting the same with the upper part of each settling tank, a branch line connecting the same with the bottom of each settling tank, valves in the branch lines, a separator tank, a pipe extending into the separator tank and having its bottom connected with the bottom thereof, the lower end of the pipe having a slot therein, means for connecting the pipe with the supply pipe for the liquid to be cleaned, a pipe connected with the top part of the separator tank, a second pipe connected with the last mentioned pipe and extending into the first settling tank with its lower end connected to the bottom of the tank, said lower end of the pipe having a slot therein and a perforated tube depending into each settling tank from the top thereof and to which the branch pipe is connected.

4. A cleaning plant of the class described comprising a number of settling tanks, a pipe connecting the upper portion of one tank with the lower portion of the next tank, a separator tank, means for introducing the fluid to be cleaned thereinto, means for connecting the upper portion of the separator tank with the first settling tank, means for pumping the liquid from the upper portion of each settling tank and means for drawing liquid and sediment from the bottoms of the settling tanks when the same are to be cleaned.

In testimony whereof I affix my signature.

HARVEY JAMES WIMBERLEY.